United States Patent
Netsch (10) Patent No.: US 6,811,646 B1
(45) Date of Patent: Nov. 2, 2004

(54) FOOD PACKAGE INSERT AND DECODER GAME

(76) Inventor: Bryan A. Netsch, 444 Remington Pl., Lewisville, TX (US) 75067

(*) Notice: Subject to any disclaimer, the term of this patent is extended or adjusted under 35 U.S.C. 154(b) by 0 days.

(21) Appl. No.: 10/793,385

(22) Filed: Mar. 4, 2004

Related U.S. Application Data (62) Division of application No. 10/287,104, filed on Nov. 4, 2002, which is a continuation-in-part of application No. 10/237,348, filed on Sep. 6, 2002, now Pat. No. 6,596,118, which is a division of application No. 09/805,517, filed on Mar. 13, 2001, now Pat. No. 6,521,322.

(51) Int. Cl.[7] .............................................. B32B 31/08
(52) U.S. Cl. ........................ 156/253; 156/252; 156/277
(58) Field of Search ................................ 156/252, 253, 156/277

(56) References Cited

U.S. PATENT DOCUMENTS

| | | |
|---|---|---|
| 1,071,226 A | 8/1913 | Goodsell et al. |
| 2,783,172 A | 2/1957 | Avery |
| 3,153,868 A | 10/1964 | Jones |
| 3,385,748 A | 5/1968 | Neale et al. |
| 4,044,181 A | 8/1977 | Edhlund |
| 4,104,816 A | 8/1978 | Pingeton |
| 4,174,857 A | 11/1979 | Koza |
| 4,310,978 A | 1/1982 | Stern |
| 4,552,789 A | 11/1985 | Winchell |
| 4,745,835 A | 5/1988 | Schnitzer |
| 4,797,291 A | 1/1989 | Pierce et al. |
| 4,837,956 A | 6/1989 | Dolence |
| 4,871,410 A | 10/1989 | Bonnebat et al. |
| 4,876,000 A | 10/1989 | Mikhail |
| 4,935,282 A | 6/1990 | Pawlowski et al. |
| 5,045,330 A | 9/1991 | Pawlowski |
| 5,127,743 A | 7/1992 | Miller et al. |
| 5,273,798 A | 12/1993 | Miner |
| 5,344,190 A | 9/1994 | Volz |
| 5,401,032 A | 3/1995 | Barnhart et al. |
| 5,425,217 A | 6/1995 | Lobash et al. |
| 5,501,491 A | 3/1996 | Thompson |
| 5,618,112 A | 4/1997 | Lovell |
| 5,776,586 A | 7/1998 | Lipper |
| 5,803,261 A | 9/1998 | Nowakowski et al. |
| 5,817,385 A | 10/1998 | Stanislav |
| 5,928,741 A | 7/1999 | Andersen et al. |
| 5,962,110 A | 10/1999 | Penke-Wevelhoff |
| 5,981,011 A | 11/1999 | Overcash et al. |
| 6,035,610 A | 3/2000 | Vonderhorst et al. |
| 6,127,012 A | 10/2000 | Nagatsuna et al. |
| 6,406,062 B1 | 6/2002 | Brooks et al. |
| 6,521,322 B1 * | 2/2003 | Bailey ..................... 428/192 |
| 6,544,629 B1 * | 4/2003 | Bailey ..................... 428/192 |
| 6,596,118 B1 * | 7/2003 | Bailey ..................... 156/253 |

FOREIGN PATENT DOCUMENTS

| | | |
|---|---|---|
| DE | 4102914 | 12/1991 |
| WO | WO 97/01435 | 1/1997 |

* cited by examiner

Primary Examiner—Alexander S. Thomas
(74) Attorney, Agent, or Firm—Luedeka, Neely & Graham PC (57) ABSTRACT

A food package insert comprising a multi-part structure having at least one removable edge portion. The multi-part structure includes an oil and grease resistant cellulosic support web having first and second exterior surfaces, first and second facing interior surfaces, and a support web edge portion disposed adjacent the removable edge portion thereof. At least one hidden image is imprinted on one of the first and second facing interior surfaces. The hidden image is printed in a first color and a second color is imprinted over the first color in a pattern sufficient to substantially hide the hidden image. A colored film insert is attached to the fixed edge portion of the web between the facing first and second interior surfaces. The colored film insert is printed with the second color and is at least partially transparent for revealing a hidden image printed on one of the first and second interior surfaces.

15 Claims, 7 Drawing Sheets

FOOD PACKAGE INSERT AND DECODER GAME

RELATED APPLICATIONS

This application is a division of application Ser. No. 10/287,104, filed Nov. 4. 2002 pending, which is a continuation-in-part of Ser. No. 10/237,348, filed on Sep. 6, 2002, now U.S. Pat. No. 6,596,118, issued Jul. 22, 2003, which is a division of Ser. No. 09/805,514 filed Mar. 13, 2001, now U.S. Pat. No. 6,521,322, issued Feb. 18, 2003, and is related to U.S. Pat. No. 6,544,629, issued Apr. 8, 2003.

FIELD OF THE INVENTION

The invention relates to a food package insert and more particularly to a multi-part insert containing a decoder game for food packages and methods for making the inserts.

BACKGROUND

Inserts for food packages have been used for a number of years for promotional and entertainment purposes, e.g. game pieces, prizes and the like. In order to protect food in the packages from contamination from the inserts, the inserts are typically sealed in an impervious film envelope, e.g., the inserts are over-wrapped with a protective barrier film. The barrier film not only protects the food from contamination but also reduces the absorption of oil, grease and/or moisture from the food which can soil or damage a printed insert. However, over-wrapping the insert is a secondary, independent process that is conducted after printing the insert. Accordingly, over-wrapping adds costs and time to provide a finished over-wrapped insert product.

Because of the over-wrapping, the insert must be smaller so that the overall over-wrapped insert meets particular size criteria. In some cases, the over-wrapping is damaged or not properly sealed thereby leading to damage of the insert. Another problem with over-wrapped inserts is that the over-wrapping may pose a choking hazard for small children. The plastic over-wrap is typically not water soluble and if ingested by a child may cause injury or death.

Accordingly, there is a need for inserts for food packages which are safe for children and which can be produced in high volume with a relatively low cost. There is also a need for a method for producing game or prize inserts for food packages which will not contaminate the food and are not soiled by the food itself.

SUMMARY OF THE INVENTION

With regard to the foregoing and other objects and advantages, the invention provides a food package insert comprising a multi-part, in-line produced structure having at least one removable edge portion along a first edge thereof and a second edge portion opposite the removable edge portion. The multi-part structure includes an oil and grease resistant cellulosic support web having first and second exterior surfaces, first and second facing interior surfaces, and a support web edge portion disposed adjacent the removable edge portion thereof. At least one hidden image is imprinted on one of the first and second facing interior surfaces, the hidden image being is printed in a first color and having a second color imprinted over the first color in a pattern sufficient to substantially hide the hidden image. A colored film insert is attached to the fixed edge portion of the support web between the facing first and second interior surfaces thereof. The colored film insert is printed with the second color and is at least partially transparent for revealing the hidden image printed on one of the first and second interior surfaces. The first and second exterior surfaces, first and second interior surfaces, and multicolored film insert are printed by an in-line printing process.

In another aspect, the invention provides a method for making a method for making a food safe food package insert having multiple parts. Each insert has at least one removable edge portion on a first edge thereof and a second edge portion opposite the removable edge portion. The method includes the steps of providing a first cellulosic support web having at least one removable edge portion on a first edge thereof, a second edge portion on a second edge thereof opposite the first edge, a first inner surface, and a first outer surface. At least a first color is printed on one surface of a polymeric film by an in-line printing process so that the polymeric film remains partially transparent. The polymeric film has at least one removable edge portion on a first edge thereof, and a second edge portion on a second edge thereof opposite the first edge. A second cellulosic support web having at least one removable edge portion on a first edge thereof, a second edge portion on a second edge thereof opposite the first edge, a second inner surface, and a second outer surface is provided. An image is printed using a second color on one of the first and second inner surfaces and first and second outer surfaces of the first and second cellulosic webs by an in-line printing process. The image is over-printed with the first color in a pattern sufficient to provide a substantially hidden image. The film is disposed between the first cellulosic support web and the second cellulosic support web. The first edge portion and the second edge portion of the first support web, second support web and polymeric film are attached to one another to provide the multiple part food package insert.

An important advantage of the food package insert of the invention is that the entire assembly is made of cellulosic materials, food grade inks and adhesives. Another advantage is that the insert may be made of completely water soluble materials without the need for over-wrapping or placing the insert in an impervious envelope. This feature enables a plurality of inserts to be made from an elongate web and detached from the elongate web at the point the inserts are place in food containers. Accordingly, the entire process for making the elongate webs containing decoder game pieces may be provided by a continuous printing and assembling unit.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
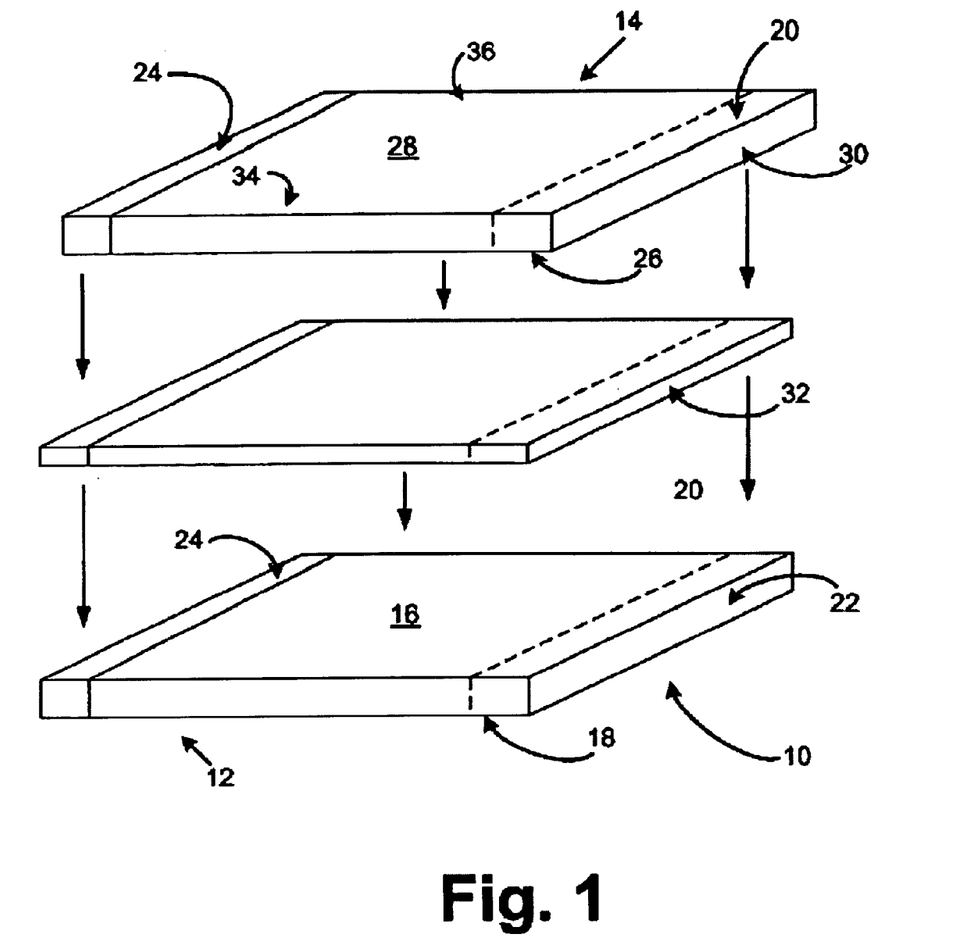
FIG. 1 is an exploded view of an insert made according to the invention.
Figure 2:
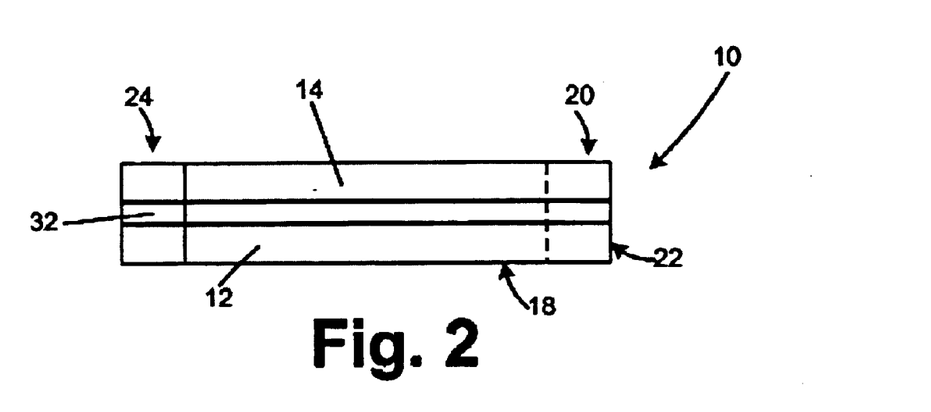
FIG. 2 is a side-elevational view of an insert made according to the invention.

With initial reference to FIGS. 1 and 2, a food insert according to the invention is provided by a multi-layered structure 10 including a first cellulosic support web 12 and a second cellulosic support web 14 preferably made of oil and grease resistant (OGR) webs. The first support web 12 has a first surface 16 and a second surface 18 opposite the first surface 16. At least one removable edge portion 20 is provided on a first edge 22 of the first support web 12 and second edge portion 24 is disposed opposite the removable edge portion 22. The second edge portion 24 may be a fixed edge portion or a removable edge portion of the multi-layered structure 10.

Likewise, the second support web 14 has a first surface 26 and a second surface 28 opposite the first surface 26. The at least one removable edge portion 20 is provided on a first edge 30 of the second support web 14 and second edge portion 24 is disposed opposite the removable edge portion 20. The second edge portion 24 may be a fixed edge portion or a removable edge portion of the multi-layered structure 10.

The first and second support webs 12 and 14 are preferably provided by a relatively heavy weight paper or paperboard material which is treated so as to be substantially oil and grease resistant and is approved for direct food contact. For the purposes described herein, the support webs 12 and 14 cannot be treated with chemicals which are leachable from the web and are harmful if ingested. Particularly preferred support webs 12 and 14 include a 50 pound per ream OGR web made by Badger Paper Mills, Inc. of Peshtigo, Wis. The oil and grease resistance of the support webs 12 and 14 may be provided by incorporating suitable chemicals in the web during manufacture of the webs 12 and 14 or by applying a layer of oil and grease resistant material, such as polypropylene to the second surfaces 18 and 28 of the support webs.

The first surfaces 18 and 28 of the support webs 12 and 14, are preferably printed with non-toxic inks suitable for direct food contact. The non-toxic inks are preferably water soluble inks which exhibit excellent adhesion and abrasion resistance when applied to cellulosic webs and to medium, low or high density treated polyethylene, polypropylene, cellophane, foils and the like. Such inks are available from Colorcon, Inc. of West Point, Pa. under the trade name NT-23.

The second surfaces 16 and 26 of the support webs 12 and 14 and a polymeric film 32 disposed between the first and second web 12 and 14 may also be printed with inks which are suitable for indirect food contact. Such inks are also preferably non-toxic inks which are sanctioned by the Food & Drug Administration (FDA) and the United States Department of Agriculture (USDA) as acceptable for minimal food contact applications. The inks are water-based and comply with Environmental Protection Agency (EPA) regulations. Such inks may be applied to the surfaces 18 and 46 by flexographic and gravure printers and are available from Colorcon, Inc. under the trade name FLEXICRAFT.

The adhesive used to attach the support webs 12 and 14 and the film 32 to one another along the removable edge portion 20 and the fixed or removable edge portion 24 of the multi-layered structure 10 is preferably a low odor adhesive suitable for indirect food contact. Such adhesives are preferably aqueous adhesives based upon ethylene/vinyl acetate emulsions, polyvinyl alcohols, acrylic and polyurethane dispersions and emulsions available from Croda Adhesives, Inc. of Itasca, Ill. under the trade name CRODAFIX 57-174. The adhesive is preferably applied only in the edge portions 20 and 24 of the multi-layered structure 10. However, for applications requiring the multilayered structure to be inserted in a salty food snack such as potato chips and the like, it is desirable to also apply the adhesive adjacent opposing side edge portions 34 and 36 of the multi-layered structure 10, so that the interior surfaces 16 and 26 and film 32 are sealed on all four edge portions from the food contact.

Figure 3A:
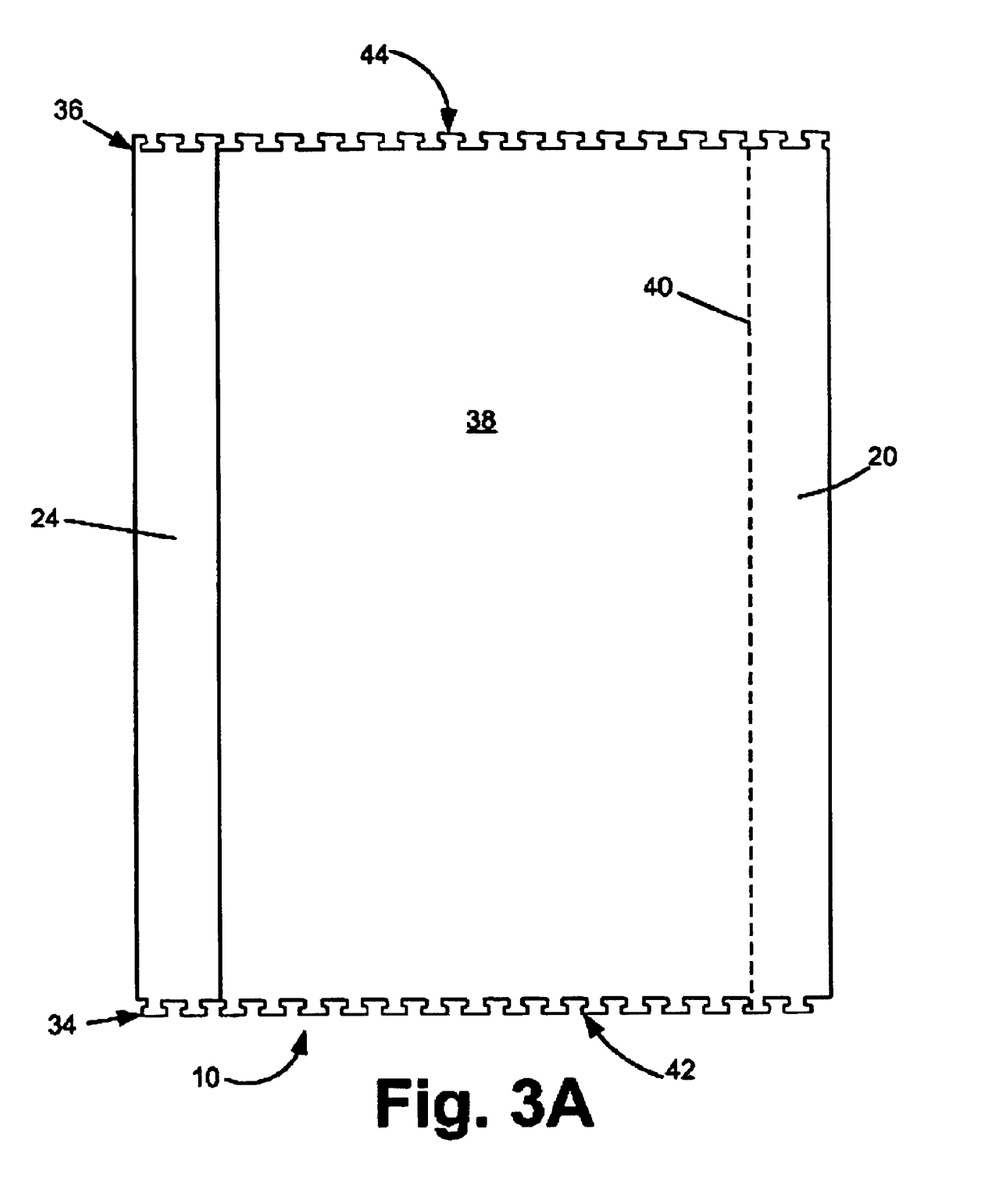
FIG. 3A is a plan view of an insert made according to the invention with a removable edge portion.
Figure 3B:
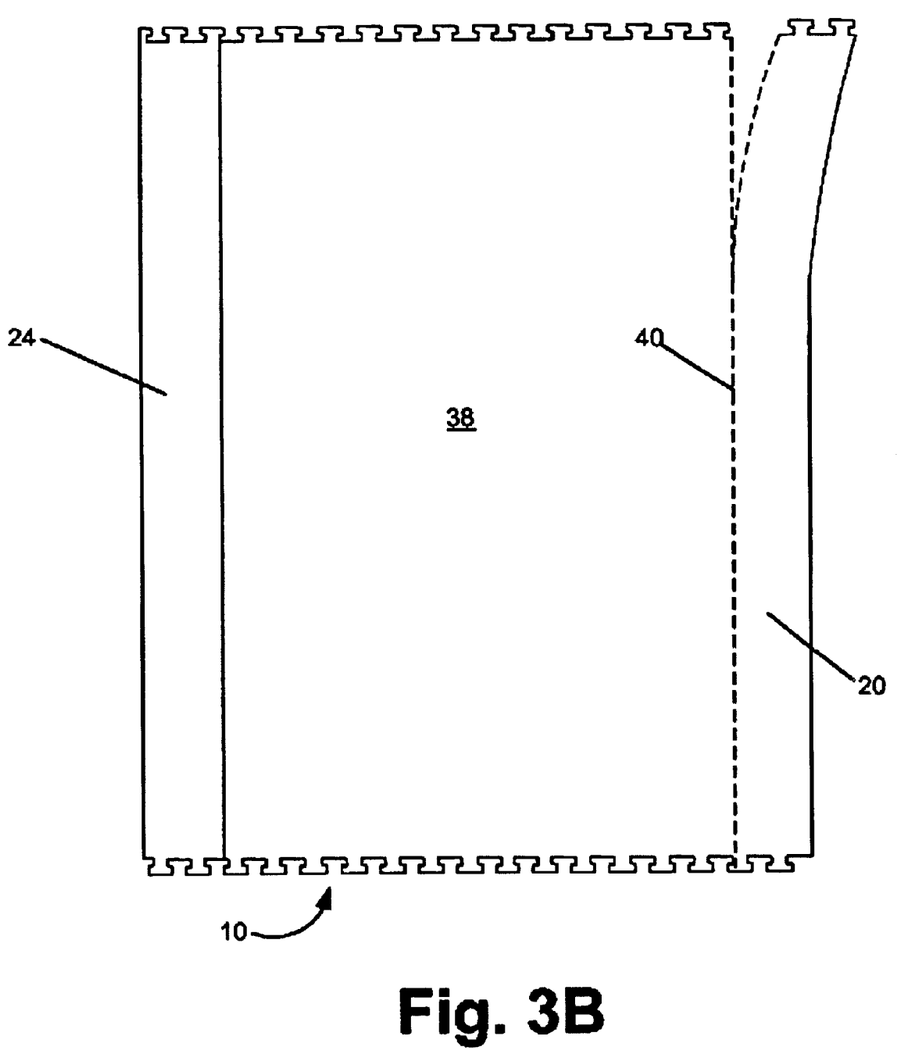
FIG. 3B is a plan view of an insert according to the invention with a removable edge portion partially removed.

With reference to FIGS. 3A and 3B, the removable edge portion 20 is preferably separable from a main portion 38 of the multi-layered structure 10 by is perforated seam 40. A partially removed edge portion 20 is illustrated in FIG. 3B. Any perforations suitable for aiding separation of the edge portion 20 from the main portion 38 may be used. It will be recognized that a perforated seam such as seam 40 may also be used for edge portion 24 in the instance where edge portion 24 is also a removable edge portion rather than a fixed edge portion.

A particularly important feature of the invention are perforations 42 and 44 on the opposing side edge portions 34 and 36, respectively. Perforations 42 and 44 are disposed in an elongate multi-layered web to provide individual inserts 10. The perforations 42 and 44 enable the inserts 10 to be separated from one another during a food package insertion process described in more detail below. The perforations 42 and 44 must be sufficient to hold individual inserts 10 together in an elongate multi-layered web, yet the inserts 10 must be readily separable from one another for automatic placement of the inserts 10 in a food package. Accordingly, the burst strength or tensile strength of the perforations 42 and 44 is preferably in the range of from about 6 to about 16 pounds per lineal inch of perforations 42 and 44 on opposing side edge portions 34 and 36. The burst strength of a line of perforations is generally determined by the ratio of cut and tie of a perforation in the line of perforations, by the sharpness of the perforating blade or wheel, the pressure of the perforator, and the paper quality. A particularly preferred perforation 42 or 44 is known as a castle perf. The cut of the perforating blade for such a castle perf preferably ranges from about 0.05 to about 0.09 inches and the tie of the castle perf preferably ranges from about 0.04 to about 0.08 inches. A particularly preferred castle perf has a cut of 0.0781 inches and a tie of 0.0625 inches. To meet the desired burst strength based on the tensile strength of the substrate, a shim is added between the perf blades. The shim preferably has a thickness ranging from a bout 0.001 to about 0.002 inches. Opposing edge portions 34 and 36 may contain adhesives such as food grade pressure sensitive adhesives between the layers of the multi-layered structure in order to provide enhanced protection of the printed images and foods.

Figure 3C:
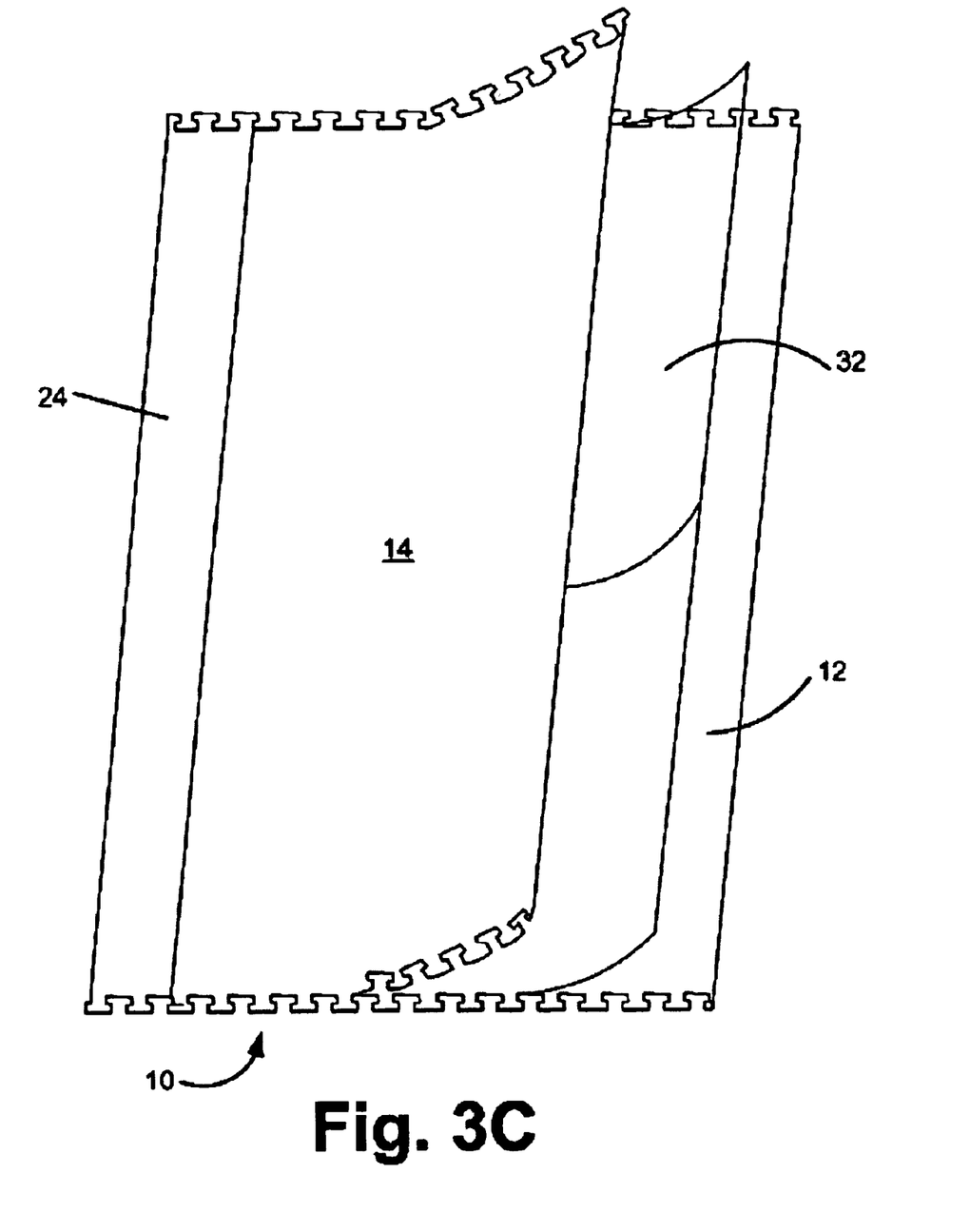
FIG. 3C is a perspective view of an insert according to the invention partially opened to expose an inner film layer.

Once the removable edge portion 20 is completely removed from the structure 10, the inner film 32 is exposed as shown in FIG. 3C. The inner film 32 is preferably made of a clear polyolefin film with a thickness of about 2 mils. The film 32 may be separate from the support webs 12 and 14 or may be attached to the edge portion 24. It is particularly preferred that the film 32 be removably attached to the edge portion 24 so that the film 32 may be separated from the structure 10. For decoder game, described below, the film 32 is preferably coated or printed with at least one color and preferably two different colors, a first color 46 and a second color 48 as shown in FIG. 4.

Figure 4:
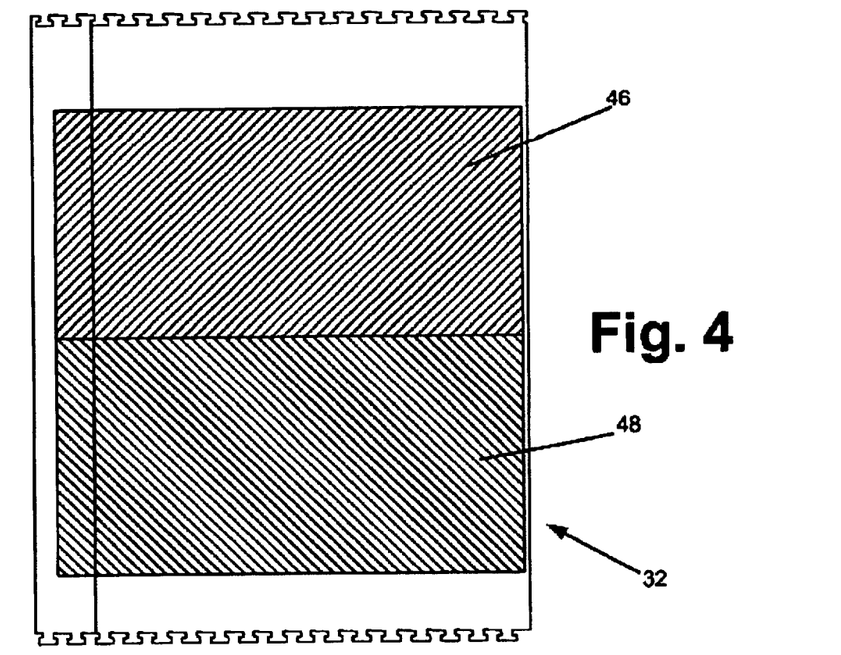
FIG. 4 is a plan view of a of an inner film layer according to the invention.
Figure 5:
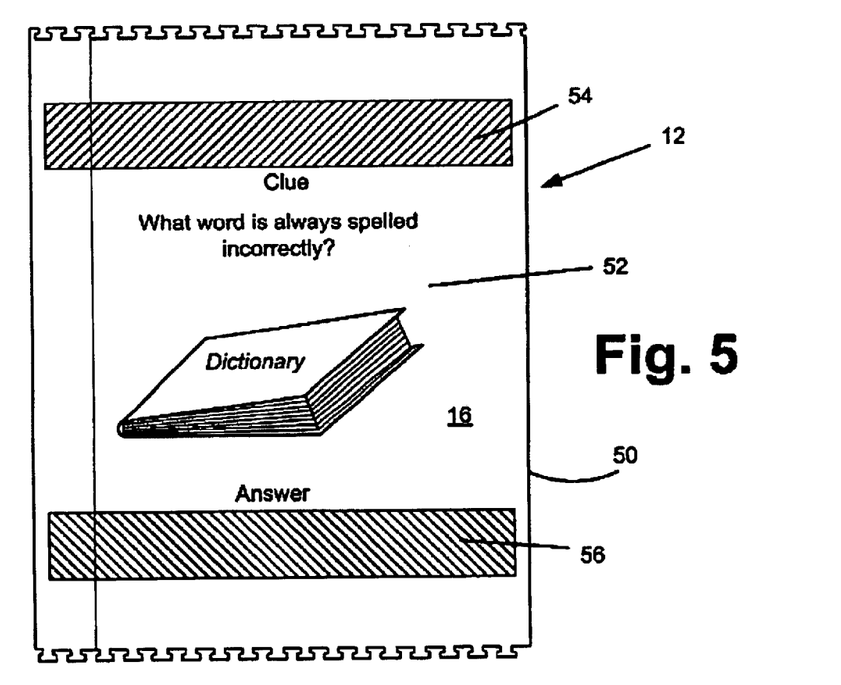
FIG. 5 is a plan view of a hidden image section of an insert according to the invention.
Figure 6:
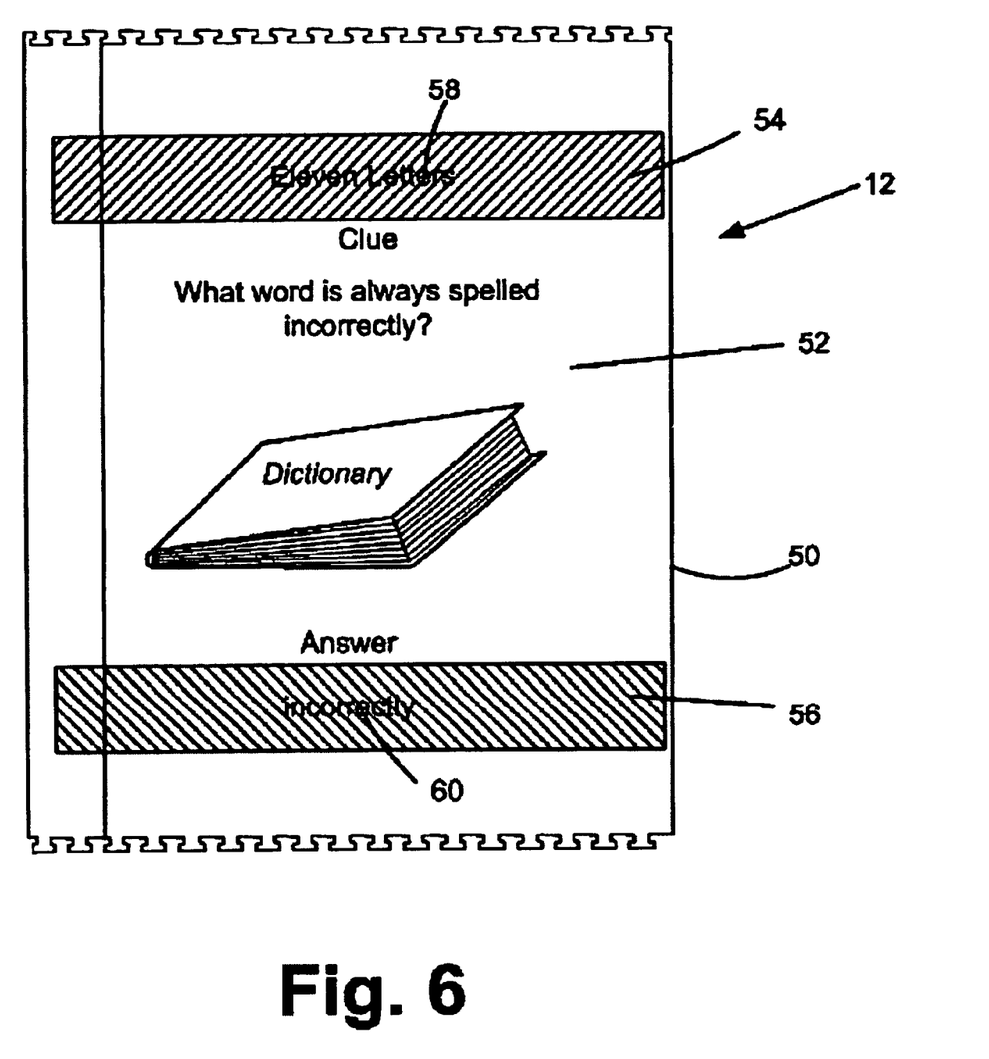
FIG. 6 is a plan view of a hidden image section of an insert showing a hidden image according to the invention.

A preferred use of the multi-layered structure 10 is as a game piece, preferably as decoder game piece containing a hidden image printed section 50, used in conjunction with colored film 32 as illustrated in FIGS. 4–6. The hidden image printed section 50 preferably contains a visible image section 52 and one or more hidden image sections 54 and 56 printed on one or more of surfaces 16 and 26 of the first and second support webs 12 and 14. Image sections 52, 54, and 56 printed on surface 16 of web 12 are described for illustrative purposes.

In order to provide a decoder game piece, images 58 and/or 60 are printed on the surface 16 of the support web 12 in the hidden image area(s) 54 and 56, respectively. The images 58 and 60 are preferably printed with the same color or a different color than the first and second colors 46 and 48 of the film 32. For example, if the first color 46 of the film 32 is red, then image 58 is preferably printed with a color on the opposite side of the color spectrum from red, such as blue. Likewise, if the second color 48 of the film is blue, then the image 50 is preferably printed with a color such as yellow. An overprint having the same tint as the first and second colors 46 and 48 is then preferably applied over the images 58 and 60 to provide hidden images in hidden image sections 54 and 56 as shown in FIG. 5. Applying the colored film 32 to the hidden image sections 54 and 56 provides viewing of the images 58 and 60 in these sections as shown in FIG. 6. Hidden images may also be applied to surfaces 18 and 28 of the support webs 12 and 14 or to the outside of a food package containing the game pieces described above for decoding with film 32.

Figure 7:
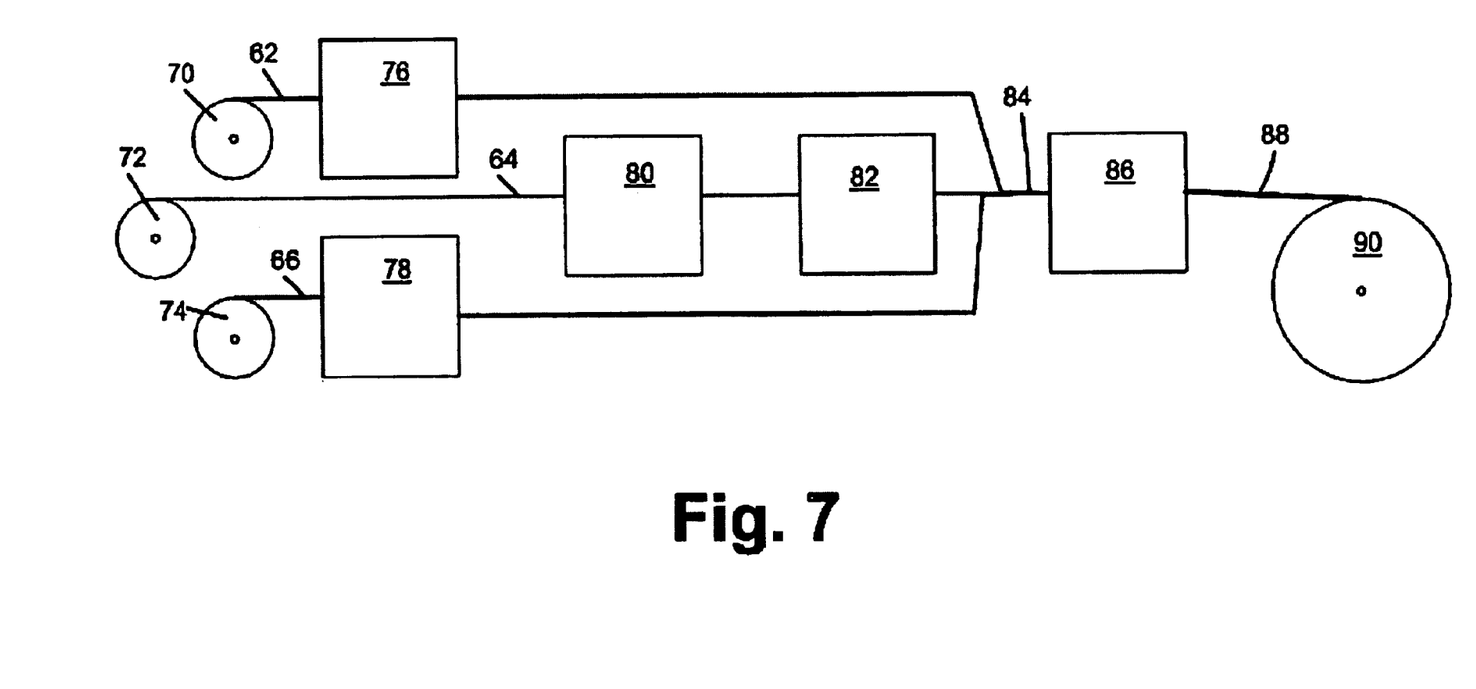
FIG. 7 is a schematic view of a process for making an insert according to the invention.

With reference to FIG. 7, a method for making the multi-layered structure 10 for insertion in a food package will now be described. The multi-layered structure 10 is preferably formed from individual elongate webs 62, 64, and 66 fed from feed rolls 70, 72 and 74. Roll 70 provides the cellulosic support web 14, roll 72 provides the polymeric film 32, and roll 74 provides the support web 12. Each of the webs 12, 14, and 32 are processed through multiple printing units represented by rectangles 76, 78 and 80. The printing units, for example, may include from one to sixteen units to apply black, cyan, magenta, yellow and/or opaque white inks to each side of the webs. The printing units represented by rectangle 76 provide printing to the first and second surfaces 26 and 28 of the support web 14. The printing units represented by rectangle 78 provide printing to the first and second surfaces 16 and 18 of the support web 12. The printing units represented by rectangle 80 provide printing to the polymeric film 32.

Web 64 is also passed through an adhesive unit 82 which may be one or two printing units which apply adhesives to the opposing surfaces of web 64 in the removable edge portion 20 and opposing edge portion 24 of the polymeric film 32. Adhesive units may also be used to apply adhesive to edge portions 20 and 24 on surfaces 16 and 26 of the support webs 12 and 14.

Once the adhesive is applied to the edge portions 20 and 24, the webs 62 and 66 are adhesively attached to the polymeric film 32 to provide an elongate composite web 84. If desired, in order to improve the oil and grease resistance of the multi-layered structure 10 made from the composite web, a polymeric layer such as polypropylene may be applied to surfaces 18 and 28 of the support webs 12 and 14 by an extruder, printing unit or coater. The amount of a polymeric layer preferably ranges from about 0.05 to about 1.5 mils providing a polymeric layer thickness ranging from about 0.5 to about 1.5 mils.

After the composite web 84 is formed, with or without the polymeric layer, the composite web 84 is perforated in a perfing unit 86 to provide individualized food inserts which may be removed from the elongate composite web 84. The perforated web 88 may then be rolled on a transfer roll 90 for transportation to a food packaging plant.

In the alternative, a perforated web 88 may be fed directly to an in-pack machine which separates individual inserts from the web 88 and disposes the inserts in a former funnel of a food package filling machine. Since the package filling machine and the printing units 76, 78 and 80, adhesive unit 82, and perfing unit 86 do not typically run at the same speed as the package filling machine, multiple package filling machines may be provided in line with the manufacture of the perforated web 88.

In the food packaging machine, the insert is combined with food as food packages are being filled on a continuous basis. Accordingly, the insert of the invention is adaptable to a continuous operation which provides inserts from an elongate web 88 formed in a separate operation or in a separate location and inserts formed directly from the printing and perfing machines in the same location as the food packaging machine. Elimination of the over-wrapping step also provides an improved food package insert as described above thereby reducing operating and equipment costs for providing such inserts.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for making a food safe food package insert having multiple parts, each insert having at least one removable edge portion on a first edge thereof and a second edge portion opposite the removable edge portion, the method comprising the steps of:

providing a first cellulosic support web having at least one removable edge portion on a first edge thereof, a second edge portion on a second edge thereof opposite the first edge, a first inner surface, and a first outer surface;

printing at least a first color on one surface of a polymeric film by an in-line the printing process so that the polymeric film remains partially transparent, the polymeric film having at least one removable edge portion on a first edge thereof, and a second edge portion on a second edge thereof opposite the first edge;

providing a second cellulosic support web having at least one removable edge portion on a first edge thereof, a second edge portion on a second edge thereof opposite the first edge, a second inner surface, and a second outer surface;

printing an image using a second color on one of the first and second inner surfaces and first and second outer surfaces of the first and second cellulosic webs by an in-line printing process;

overprinting the image with the first color in a pattern sufficient to provide a substantially hidden image;

disposing the film between the first cellulosic support web and the second cellulosic support web; and attaching the first edge portion and the second edge portion of the first support web, second support web and polymeric film to one another to provide the multiple part food package insert.

2. The method of claim 1 wherein the first and second cellulosic support webs and the polymeric film are comprised of elongate webs, the method further comprising perforating the elongate webs on opposing edge portions perpendicular to the first and second edge portions to provide a plurality of food package inserts removably attached to one another along perforated edge portions thereof.

3. The method of claim 2 wherein the web is perforated so that the perforated edges have a burst strength ranging from about 6 to about 16 pounds per lineal inch of the perforated edges.

4. The method of claim 2 wherein the elongate webs are perforated with castle-shaped perforations.

5. The method of claim 2 further comprising detaching the laminate web inserts from the elongate web to provide individual food package inserts.

6. The method of claim 1 further comprising applying a thermoplastic material resistant to oil and grease to first and second outer surfaces of the support webs.

7. The method of claim 1 the second edge portions comprises a removable edge portions.

8. The method of claim 1 wherein the first color is blue and the second color is yellow.

9. The method of claim 1 wherein the first color is red and the second color is blue.

10. The method of claim 1 wherein the first yellow is blue and the second color is blue.

11. The method of claim 1 wherein the first color is blue and the second color is red.

12. A method for making an elongate cellulosic multi-part web containing at least one printed image thereon and a colored, substantially transparent colored film interposed between first and second portions of the multi-part web, comprising the steps of:

providing a first web of oil and grease resistant cellulosic material having a first removable edge portion and a second edge portion opposite the first edge portion;

feeding the first web having a first inner surface and a first outer surface through one or more printing units to provide a printed image on at least one surface thereof, the printed image being provided by a first color and a second color imprinted in a pattern over the first color to provide a substantially hidden image;

providing a second web of oil and grease resistant cellulosic material having a first removable edge portion and a second edge portion opposite the first edge portion;

providing a substantially transparent elongate polymeric film having a first removable edge portion and a second edge portion opposite the first edge portion;

printing at least the second color on one surface the polymeric film to provide a substantially transparent, colored elongate polymeric film;

applying an adhesive on the first and second edge portions of the elongate polymeric film;

attaching the first and second edge portions of the first and second webs to the first and second edge portions of the polymeric film so that the film is disposed between the first and second webs and is facing the first and second inner surfaces of the webs to provide the multi-part web;

perfing the multi-part web in a die unit to provide a plurality of individualized inserts having perforations on opposing ends thereof perpendicular to the first and second edge portions.

13. The method of claim 12 wherein the perforations have a burst strength ranging from about 6 to about 16 pounds per lineal inch of the perforations.

14. The method of claim 13 wherein the perforations comprise castle-shaped perforations.

15. The method of claim 12 further comprising applying a thermoplastic material resistant to grease to the first and second outer surfaces of the first and second webs.

* * * * *